No. 660,443. Patented Oct. 23, 1900.
M. E. KONKLE.
LID FOR COOKING UTENSILS.
(Application filed May 10, 1900.)
(No Model.)
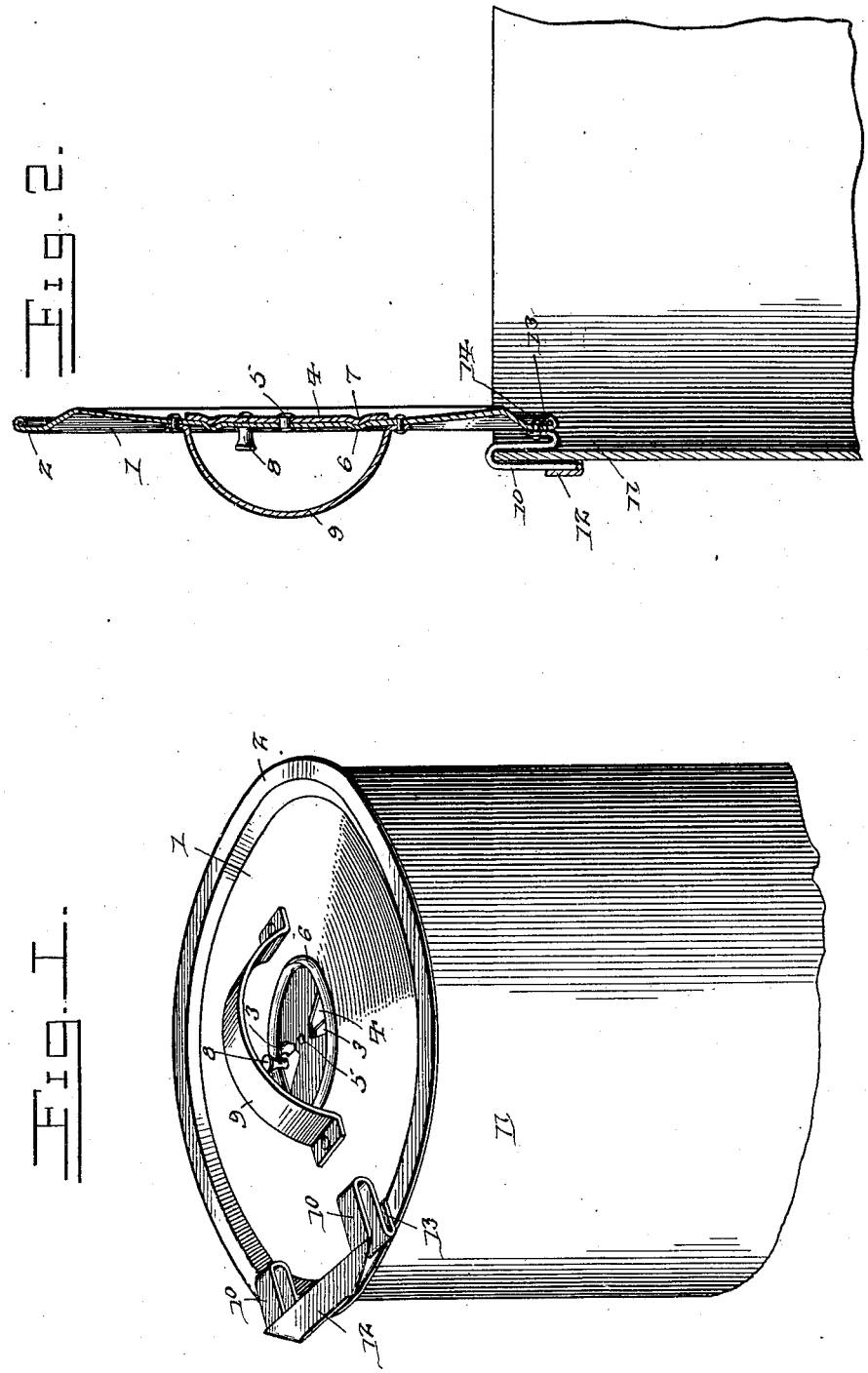
Witnesses
F. E. Alden.
[signature]
Mary E. Konkle Inventor
by C. A. Snow & Co.
Attorneys

UNITED STATES PATENT OFFICE.

MARY ELIZABETH KONKLE, OF MONTOURSVILLE, PENNSYLVANIA.

LID FOR COOKING UTENSILS.

SPECIFICATION forming part of Letters Patent No. 660,443, dated October 23, 1900.

Application filed May 10, 1900. Serial No. 16,240. (No model.)

*To all whom it may concern:*

Be it known that I, MARY ELIZABETH KONKLE, a citizen of the United States, residing at Montoursville, in the county of Lycoming and State of Pennsylvania, have invented a new and useful Lid for Cooking Utensils, of which the following is a specification.

This invention relates to lids or covers for cooking utensils, and has for its object to provide the same with improved means for supporting a lid upon the upper edge of a utensil, so as to expose the interior of the latter and to insure the draining of the moisture upon the under side of the lid to the interior of the utensil, thus preventing said moisture from dropping upon the top of the stove.

With this and other objects in view the present invention consists in the combination and arrangement of parts, as will be hereinafter more fully described, shown in the accompanying drawings, and particularly pointed out in the appended claim, it being understood that changes in the form, proportion, size, and minor details may be made within the scope of the claim without departing from the spirit or sacrificing any of the advantages of the invention.

In the drawings, Figure 1 is a perspective view of the improved lid or cover applied to close the open upper side of a cooking utensil. Fig. 2 is a vertical sectional view illustrating the lid supported upon the upper edge of a utensil by means of the present invention.

Corresponding parts in the figures of the drawings are designated by like characters of reference.

Referring to the drawings, 1 designates an ordinary sheet-metal lid or cover of any preferred shape, having the usual flat marginal rim 2 to rest upon the upper edge of a utensil when the lid is applied to cover the same. Centrally of the lid there is provided a pair or more of radial slots or openings 3 for the escape of the steam generated by the boiling of the contents of the utensil to which the lid may be applied. To control these openings, there is provided a damper plate or disk 4, which is located upon the under side of the lid and is mounted to oscillate upon a central pivot-pin 5, disposed centrally between the opposite slots or openings in the lid. The latter and the damper-plate are provided with the respective concentric and registering groove 6 and rib or bead 7, pressed therein to guide and brace the plate in the movement thereof. A suitable finger-piece 8 projects outwardly from the outer side of the damper-plate and also outwardly through one of the slots or openings in the lid, so as to be accessible from the upper side of the lid to open and close the ventilating-openings. A suitable bowed handle 9 arches diametrically over the openings and the damper-plate, so that the finger-piece is located at one side of the handle and in position to be operated by the hand which grasps the handle when the lid is being applied or removed from a utensil.

To support the lid in an upright position, as shown in Fig. 2 of the drawings, I provide a pair of substantially U-shaped hooks or clips 10, which have their respective sides secured to the outer side of the rim of the lid, so that the slots or openings between the sides of the respective clips open outwardly to receive the upper edge of a utensil 11, whereby the opposite sides of the clips embrace the wall of the utensil, and thereby support the lid, the latter being located upon the inner side of the utensil, so that the moisture which may have collected upon the under side of the lid may drain down into the interior of the utensil, and thus be prevented from dropping upon the top of the stove.

In practice I prefer to form the supporting device from a single strip of sheet metal, which is bent intermediate of its ends to form a cross-piece 12, from which the opposite end portions of the strip extend substantially at right angles and upon the same side thereof. Each end of the strip is bent or folded into a substantially U-shaped clip 10, with its central slot opening outwardly or toward the cross-piece. The outer extremity of each clip is bent rearwardly and outwardly to form an attaching-ear 13, which is soldered or connected to the rim of the lid by means of fastenings 14. Thus a pair of spaced clips or hooks are provided which are connected and braced at their outer ends by a cross-piece, which also is designed to form a broad bearing against the outer side of the utensil to firmly support the lid. Furthermore, the cross-piece forms an additional handle for the manipulation of the lid and also forms means whereby the latter may be hung upon a hook or nail when not in use.

By reference to Fig. 2 of the drawings it will be seen that the lid is connected directly to the inner side of the U-shaped supporting-clip, so that the connection between these two parts is below the point of support or the bend of the clip, whereby the lid is in a state of stable equilibrium and not subject to accidental displacement.

What is claimed is—

In combination, a lid for cooking utensils, and a supporting-clip therefor, which is formed from a single strip having its opposite ends folded transversely across the intermediate portion thereof and projecting at the same side of said intermediate portion, the end portions being rebent in the opposite direction and forming slots for the reception of the edge of a cooking utensil, and the terminals of the strip being rebent upon the outer side thereof and fixedly secured to the outer side of the lid and adjacent to the marginal edge thereof.

In testimony that I claim the foregoing as my own I have hereto affixed my signature in the presence of two witnesses.

MARY ELIZABETH KONKLE.

Witnesses:
N. B. HARMAN,
MARTHA SHAFFER.